United States Patent
Liu et al.

(10) Patent No.: US 9,523,819 B2
(45) Date of Patent: Dec. 20, 2016

(54) OPTICAL COMPONENT AND OPTICAL DEVICE

(71) Applicant: Huawei Technologies Co., Ltd., Shenzhen (CN)

(72) Inventors: Xishe Liu, Shenzhen (CN); Shijun Wang, Wuhan (CN); Heyuan Liu, Lagos (NG); Zhiyong Xiao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/744,948

(22) Filed: Jun. 19, 2015

(65) Prior Publication Data

US 2015/0286003 A1     Oct. 8, 2015

Related U.S. Application Data

(63) Continuation of application No. PCT/CN2013/090029, filed on Dec. 20, 2013.

(30) Foreign Application Priority Data

Dec. 28, 2012   (CN) .......................... 2012 1 0584458

(51) Int. Cl.
   *G02B 6/32*      (2006.01)
   *G02B 6/26*      (2006.01)
   (Continued)

(52) U.S. Cl.
   CPC ................. *G02B 6/264* (2013.01); *G02B 1/11* (2013.01); *G02B 6/327* (2013.01); *G02B 6/25* (2013.01); *G02B 6/3554* (2013.01)

(58) Field of Classification Search
   CPC ........... G02B 6/264; G02B 1/11; G02B 6/327; G02B 6/3863; G02B 6/32; G02B 6/3672; G02B 6/124; G02B 6/322; G02B 6/3822; G02B 6/4202; Y10T 29/49801; B24B 19/226
   (Continued)

(56) References Cited

U.S. PATENT DOCUMENTS

6,393,187 B1    5/2002  Engelberth et al.
7,231,116 B2 *  6/2007  Tanaka ............... G02B 6/29389
                                                      385/24

(Continued)

FOREIGN PATENT DOCUMENTS

CN    201828684 U    5/2011
EP      2383592 A1   11/2011

*Primary Examiner* — Ellen Kim
(74) *Attorney, Agent, or Firm* — Slater Matsil, LLP

(57) ABSTRACT

The present invention provides an optical component and an optical device, and the optical component includes a two-dimensional fiber array and a compensation block, where an end face of the two-dimensional fiber array is obliquely polished as a whole; the compensation block is disposed between the two-dimensional fiber array and another optical component; any two light beams that pass through the two-dimensional fiber array and are emitted from the obliquely polished end face of the two-dimensional fiber array are incident to an end face of the compensation block in parallel, and are incident to an end face of the another optical component in parallel after being refracted by another end face of the compensation block.

15 Claims, 2 Drawing Sheets

(51) Int. Cl.
  *G02B 1/11* (2015.01)
  *G02B 6/25* (2006.01)
  *G02B 6/35* (2006.01)

(58) Field of Classification Search
  USPC .................................. 385/33, 31, 49, 38
  See application file for complete search history.

(56) References Cited

U.S. PATENT DOCUMENTS

| | | |
|---|---|---|
| RE40,416 E | 7/2008 | Jian |
| 8,442,089 B2* | 5/2013 | Nakai ................. H01S 3/061 372/101 |
| 8,538,209 B1* | 9/2013 | Li ....................... G02B 6/29368 385/31 |
| 2002/0097956 A1* | 7/2002 | Kikuchi ................. G02B 6/327 385/33 |
| 2003/0099430 A1* | 5/2003 | Li ........................ G02B 6/3524 385/18 |
| 2003/0123792 A1 | 7/2003 | Matsumoto et al. |
| 2003/0138210 A1 | 7/2003 | Steinberg et al. |
| 2003/0228100 A1 | 12/2003 | Kikuchi et al. |
| 2004/0047557 A1 | 3/2004 | Muto et al. |
| 2004/0047558 A1* | 3/2004 | Yasuda .................... G02B 6/32 385/33 |
| 2004/0184729 A1 | 9/2004 | Martin et al. |
| 2006/0193560 A1 | 8/2006 | Yang et al. |
| 2008/0226229 A1 | 9/2008 | Nakagawa |

* cited by examiner

OPTICAL COMPONENT AND OPTICAL DEVICE

CROSS REFERENCE

This application is a continuation of International Application No. PCT/CN2013/090029, filed on Dec. 20, 2013, which claims priority to Chinese Patent Application No. 201210584458.7, Dec. 28, 2012, both of which are hereby incorporated by reference in their entireties.

TECHNICAL FIELD

The present invention relates to communications technologies, and in particular, to an optical component and an optical device.

BACKGROUND

With the development of optical communications technologies, requirements for optical switches with large capacity and high performance are increasingly growing in fields of optical switching, reconfigurable optical add/drop multiplexer ("ROADM"), online monitoring, and the like. However, currently, a key parameter, a return loss ("RL") of a two-dimensional fiber array ("FA") that is an important component in an optical switch can generally reach only 30 dB-40 dB, which causes relatively loud noise in a system and limits an application scope of the optical switch.

Currently, an RL of a two-dimensional FA is mainly improved by using the following method: An end face of the FA is horizontally polished, and matching fluid whose refractive index is consistent with a refractive index of a fiber is filled in between the FA and a to-be-combined component (such as an optical glass). An RL of a two-dimensional FA designed using this method may reach above 60 dB. However, it is difficult to obtain a material whose refractive index completely matches the refractive index of the fiber; in addition, efficient sealing of the matching fluid between the FA and the to-be-combined component is extremely difficult and is costly; therefore it is difficult to achieve large-scale production.

SUMMARY

The present invention provides an optical component and an optical device, which are used to improve an RL of a two-dimensional FA, and also reduce process difficulties and production costs.

According to a first aspect, the present invention provides an optical component, including a two-dimensional fiber array and a compensation block, where an end face of the two-dimensional fiber array is obliquely polished as a whole, and the compensation block is disposed between the two-dimensional fiber array and another optical component; and any two light beams that pass through the two-dimensional fiber array and are emitted from the obliquely polished end face of the two-dimensional fiber array are incident to an end face of the compensation block in parallel, and are incident to an end face of the another optical component in parallel after being refracted by another end face of the compensation block; a length $\lambda 1$ of a path along which a first incident light beam is emitted from the obliquely polished end face of the two-dimensional fiber array, passes through the compensation block, and reaches the end face of the another optical component is equal to a length $\lambda 2$ of a path along which a second incident light beam is emitted from the obliquely polished end face of the two-dimensional fiber array, passes through the compensation block, and reaches the end face of the another optical component.

With reference to the first aspect, in a first possible implementation manner, a length $\lambda$ of a path along which any light beam is emitted from the obliquely polished end face of the two-dimensional fiber array, passes through the compensation block, and reaches the end face of the another optical component is obtained through calculation according to a formula $\lambda = L1 + (L2/n) + L3$, where L1 is a length of a path along which any outgoing light beam of the obliquely polished end face of the two-dimensional fiber array is incident from the obliquely polished end face to the end face of the compensation block, L2 is a length of a path along which the outgoing light beam passes through the compensation block, L3 is a length of a path along which the outgoing light beam is incident from the another end face of the compensation block to the another optical component, and n is a refractive index of the compensation block.

With reference to the first aspect or the first possible implementation manner of the first aspect, in a second possible implementation manner, the compensation block is an optical component, and the compensation block is in a shape of a wedge.

With reference to the first aspect or the first and the second possible implementation manners of the first aspect, in a third possible implementation manner, an anti-reflective coating is plated on the end face of the two-dimensional fiber array.

With reference to the first aspect or the first to the third possible implementation manners of the first aspect, in a fourth possible implementation manner, the end face of the two-dimensional fiber array is obliquely polished as a whole by eight degrees.

In the optical component provided in the present invention, an end face of a two-dimensional fiber array is obliquely polished as a whole, and a compensation block is disposed between the two-dimensional fiber array and another optical component, which decreases a quantity of light beams reflected back to the two-dimensional fiber array, thereby effectively improving a return loss of the two-dimensional fiber array in the optical component, where the return loss may reach above 60 dB. The optical component provided in the present invention features simple techniques and relatively low production costs, which facilitates mass production.

According to a second aspect, the present invention provides an optical device, including a two-dimensional fiber array, a compensation block, and an optical component, where an end face of the two-dimensional fiber array is obliquely polished as a whole, and the compensation block is disposed between the two-dimensional fiber array and the optical component; and any two light beams that pass through the two-dimensional fiber array and are emitted from the obliquely polished end face of the two-dimensional fiber array are incident to an end face of the compensation block in parallel, and are incident to an end face of the optical component in parallel after being refracted by another end face of the compensation block; a length $\lambda 1$ of a path along which a first incident light beam is emitted from the obliquely polished end face of the two-dimensional fiber array, passes through the compensation block, and reaches the end face of the optical component is equal to a length $\lambda 2$ of a path along which a second incident light beam is emitted from the obliquely polished end face of the two-dimensional fiber array, passes through the compensation block, and reaches the end face of the optical component.

With reference to the second aspect, in a first possible implementation manner, a length λ of a path along which any light beam is emitted from the obliquely polished end face of the two-dimensional fiber array, passes through the compensation block, and reaches the end face of the optical component is obtained through calculation according to a formula λ=L1+(L2/n)+L3, where L1 is a length of a path along which any outgoing light beam of the obliquely polished end face of the two-dimensional fiber array is incident from the obliquely polished end face to the end face of the compensation block, L2 is a length of a path along which the outgoing light beam passes through the compensation block, L3 is a length of a path along which the outgoing light beam is incident from the another end face of the compensation block to the optical component, and n is a refractive index of the compensation block.

With reference to the second aspect or the first possible implementation manner of the second aspect, in a second possible implementation manner, there is an angle α between a central optical axis of the optical component after deflection and an original central optical axis of the optical component, where a size of the angle α is the same as a size of an angle between an outgoing light beam of the compensation block and a central optical axis of the two-dimensional fiber array.

With reference to the second aspect or the first and the second possible implementation manners of the second aspect, in a third possible implementation manner, the compensation block is an optical component, and the compensation block is in a shape of a wedge.

With reference to second aspect or the first to the third possible implementation manners of the second aspect, in a fourth possible implementation manner, an anti-reflective coating is plated on the end face of the two-dimensional fiber array.

In the optical device provided in the present invention, an end face of a two-dimensional fiber array is obliquely polished as a whole, and a compensation block is disposed between the two-dimensional fiber array and an optical component in the optical device, which decreases a quantity of light beams reflected back to the two-dimensional fiber array, thereby effectively improving a return loss of the two-dimensional fiber array in the optical device, where the return loss may reach above 60 dB. The optical device provided in the present invention features simple techniques and relatively low production costs, which facilitates mass production.

DESCRIPTION OF EMBODIMENTS

Figure 1:
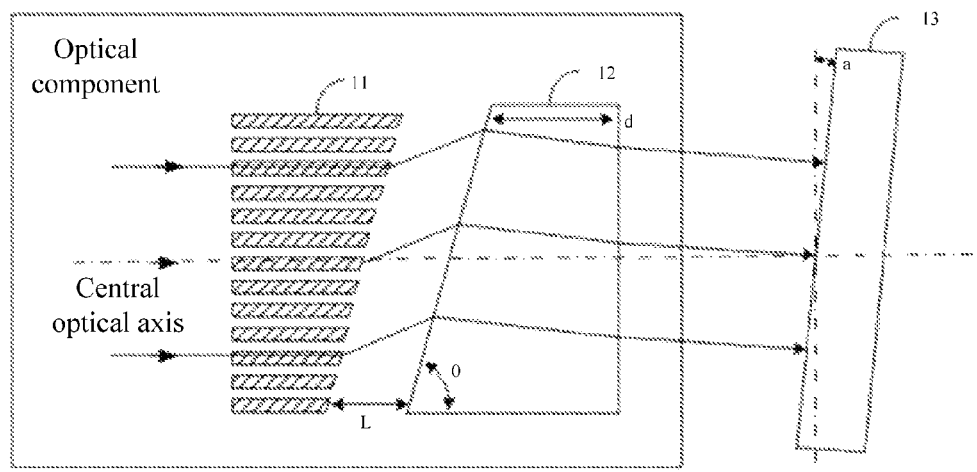
FIG. 1 is a schematic structural diagram of an optical component according to the present invention.

FIG. 1 is a schematic structural diagram of an optical component according to the present invention. As shown in FIG. 1, the optical component provided in the present invention includes a two-dimensional fiber array 11 and a compensation block 12.

An end face of the two-dimensional fiber array 11 is obliquely polished as a whole, rather than that each layer of fibers is separately polished by an angle, thereby reducing process difficulties. Theoretically, a larger angle by which the end face is obliquely polished indicates a greater return loss. To also consider coupling efficiency, it is recommended that the end face of the two-dimensional fiber array 11 be obliquely polished as a whole by eight degrees.

After the end face of the two-dimensional fiber array 11 is obliquely polished, a quantity of light beams that are emitted from the end face of the two-dimensional fiber array and that are reflected back to the end face is reduced, thereby improving a return loss of an outgoing light beam from the end face of the two-dimensional fiber array. However, after being obliquely polished, all layers of fibers have an optical path different from that of another optical component 13, which causes deterioration of optical performance. Therefore, to effectively reduce the quantity of light beams reflected back to the two-dimensional fiber array 11 and maintain the optical performance, in this embodiment, a compensation block 12 is added between the two-dimensional fiber array and the another optical component 13. The another optical component 13 may be a lens, a collimator, or the like.

After an outgoing light beam of the end face of the two-dimensional fiber array is emitted to a slope of the compensation block, a quantity of light beams reflected back to the end face is further reduced, thereby effectively improving a return loss of the two-dimensional fiber array 11. A volume of the compensation block become smaller and thickness of the compensation block becomes thinner when the compensation block uses an optical glass with a higher refractive index. The compensation block may be in a shape of a wedge, or may be in a shape of a right-angled trapezoid.

To prevent optical performance of the two-dimensional array 11 from being affected, a position relationship between the two-dimensional fiber array 11 and the compensation block 12 and a shape of the compensation block need to meet the conditions discussed below.

Any two light beams that pass through the two-dimensional fiber array and are emitted from the obliquely polished end face of the two-dimensional fiber array 11 are incident to an end face of the compensation block 12 in parallel, and are incident to an end face of the another optical component 13 in parallel after being refracted by another end face of the compensation block 12. That is, central optical lines that are generated after light beams transmitted from the two-dimensional fiber array are refracted by the compensation block are mutually parallel.

In addition, a length λ1 of a path along which a first incident light beam is emitted from the obliquely polished end face of the two-dimensional fiber array 11, passes through the compensation block, and reaches an end face of the another optical component is equal to a length λ2 of a path along which a second incident light beam is emitted from the obliquely polished end face of the two-dimensional fiber array 11, passes through the compensation block 12, and reaches the end face of the another optical component 13.

Figure 2:
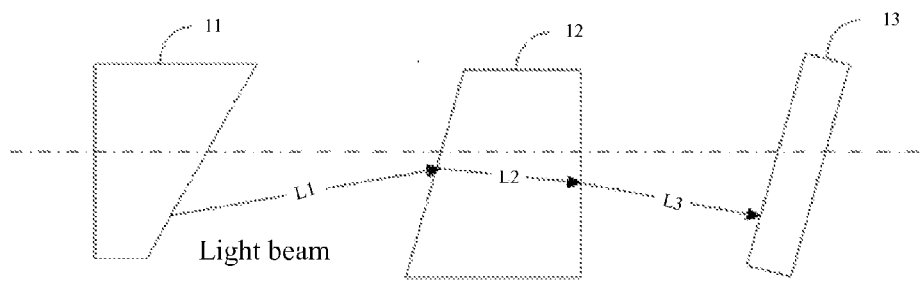
FIG. 2 is a schematic diagram of various parameters based on which λ is calculated.

Further, a length λ of a path along which any light beam is emitted from the obliquely polished end face of the two-dimensional fiber array, passes through the compensation block 12, and reaches the end face of the another optical component 13 is obtained through calculation according to a formula λ=L1+(L2/n)+L3, where, as shown in FIG. 2, L1 is a length of a path along which any outgoing light beam of the obliquely polished end face of the two-dimensional fiber array is incident from the obliquely polished end face to the end face of the compensation block, L2 is a length of a path along which the outgoing light beam passes through the compensation block, that is, a length of a path along which the outgoing light beam is incident from the end face of the compensation block to another end face of the compensation block, L3 is a length of a path along which the outgoing light beam is incident from the another end face of the compensation block to the another optical component 13, and n is a refractive index of the compensation block.

A position L of the compensation block relative to the two-dimensional fiber array, a length d of an upper base of the compensation block, and an angle θ between a lower base and a hypotenuse that are of the compensation block may be calculated according to the above conditions with combination of a material used by the compensation block.

In the optical component provided in the present invention, an end face of a two-dimensional fiber array is obliquely polished as a whole, and a compensation block is disposed between the two-dimensional fiber array and another optical component, which decreases a quantity of light beams reflected back to the two-dimensional fiber array, thereby effectively improving a return loss of the two-dimensional fiber array in the optical component, where the return loss may reach above 60 dB. The optical component provided in the present invention features simple techniques and relatively low production costs, which facilitates mass production.

Based on the foregoing embodiment, to further improve the return loss of the two-dimensional fiber array 11, an anti-reflective coating is plated on the end face of the two-dimensional fiber array 11 after the obliquely polished end face of the two-dimensional fiber array 11 is polished, which reduces the quantity of light beams reflected back to the two-dimensional fiber array 11 from the compensation block 12.

Figure 3:
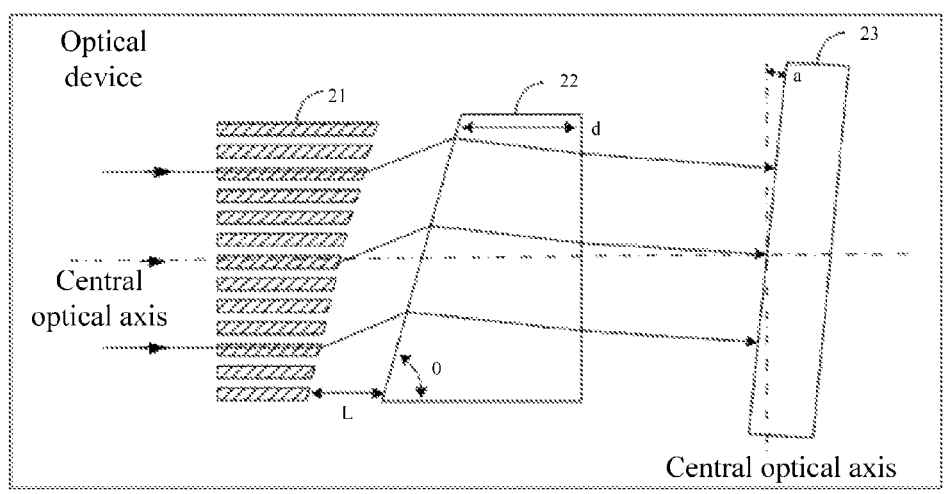
FIG. 3 is a schematic structural diagram of an optical device according to the present invention.

As shown in FIG. 3, the present invention further provides an optical device, including a two-dimensional fiber array 21, a compensation block 22, and an optical component 23.

An end face of the two-dimensional fiber array is obliquely polished as a whole. To also consider coupling efficiency, it is recommended that the end face of the two-dimensional fiber array 21 be obliquely polished as a whole by eight degrees. The optical component 23 may be a lens, a collimator, or the like.

The compensation block 22 is disposed between the two-dimensional fiber array 21 and the optical component 23. A volume of the compensation block become smaller and thickness of the compensation block becomes thinner when the compensation block uses an optical glass with a higher refractive index. The compensation block may be in a shape of a wedge, or may be in a shape of a right-angled trapezoid.

Any two light beams that pass through the two-dimensional fiber array and are emitted from the obliquely polished end face of the two-dimensional fiber array 21 is incident to an end face of the compensation block 22 in parallel, and is incident to an end face of the optical component 23 in parallel after being refracted by another end face of the compensation block 22. That is, central optical lines that are generated after light beams transmitted from the two-dimensional fiber array are refracted by the compensation block are mutually parallel.

In addition, a length Xl of a path along which a first incident light beam is emitted from the obliquely polished end face of the two-dimensional fiber array 21, passes through the compensation block, and reaches the end face of the optical component 23 is equal to a length λ2 of a path along which a second incident light beam is emitted from the obliquely polished end face of the two-dimensional fiber array 21, passes through the compensation block 22, and reaches the end face of the optical component 23.

Further, a length λ of a path along which any light beam is emitted from the obliquely polished end face of the two-dimensional fiber array, passes through the compensation block 22, and reaches the end face of the optical component 23 is obtained through calculation according to a formula $\lambda = L1 + (L2/n) + L3$, where, as shown in FIG. 2, L1 is a length of a path along which any outgoing light beam of the obliquely polished end face of the two-dimensional fiber array is incident from the obliquely polished end face to the end face of the compensation block, L2 is a length of a path along which the outgoing light beam passes through the compensation block, that is, a length of a path along which the outgoing light beam is incident from the end face of the compensation block to another end face of the compensation block, L3 is a length of a path along which the outgoing light beam is incident from the another end face of the compensation block to the optical component 23, and n is a refractive index of the compensation block.

In the optical device provided in the present invention, an end face of a two-dimensional fiber array is obliquely polished as a whole, and a compensation block is disposed between the two-dimensional fiber array and an optical component in the optical device, which decreases a quantity of light beams reflected back to the two-dimensional fiber array, thereby effectively improving a return loss of the two-dimensional fiber array in the optical device, where the return loss may reach above 60 dB. The optical device provided in the present invention features simple techniques and relatively low production costs, which facilitates mass production.

To further improve the return loss of the two-dimensional fiber array 21, an anti-reflective coating is plated on the end face of the two-dimensional fiber array 21 after the obliquely polished end face of the two-dimensional fiber array 21 is polished, which reduces the quantity of light beams reflected back to the two-dimensional fiber array 21 from the compensation block 22.

The compensation block 22 has a deflection effect on an outgoing light beam of the two-dimensional fiber array 21. To compensate for deflection of the outgoing light beam of the two-dimensional fiber array 21 caused by the compensation block 22, based on the foregoing embodiment, as shown in FIG. 3, a central optical axis of the optical component 23 needs to be deflected. There is an angle α between a central optical axis of the optical component 23 after deflection and an original central optical axis of the optical component 23, where a size of the angle α is the same as a size of an angle between an outgoing light beam of the compensation block 22 and a central optical axis of the two-dimensional fiber array 21.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An optical component, comprising:
   a two-dimensional fiber array, wherein an end face of the two-dimensional fiber array is obliquely polished as a whole in a manner that a first fiber of the two-dimensional fiber array has an end face that extends beyond an end face of a second fiber of the two-dimensional fiber array; and
   a compensation block disposed between the two-dimensional fiber array and another optical component;
   wherein the optical component is positioned so that any two light beams that pass through the two-dimensional fiber array and are emitted from the obliquely polished end face of the two-dimensional fiber array are incident to an end face of the compensation block in parallel, and are incident to an end face of the another optical component in parallel after being refracted by another end face of the compensation block;
   wherein the optical component is also positioned so that a first length ($\lambda 1$) of a path along which a first incident light beam is emitted from the obliquely polished end face of the two-dimensional fiber array, passes through the compensation block, and reaches the end face of the another optical component is equal to a second length ($\lambda 2$) of a path along which a second incident light beam is emitted from the obliquely polished end face of the two-dimensional fiber array, passes through the compensation block, and reaches the end face of the another optical component; and
   wherein L1 is a length of a path along which any outgoing light beam of the obliquely polished end face of the two-dimensional fiber array passes from the obliquely polished end face to the end face of the compensation block, and wherein L1 is greater than zero.

2. The optical component according to claim 1, wherein a common length ($\lambda$) of a path along which any light beam is emitted from the obliquely polished end face of the two-dimensional fiber array, passes through the compensation block, and reaches the end face of the another optical component is obtained through calculation according to a formula $\lambda = L1 + (L2/n) + L3$, wherein L2 is a length of a path along which the outgoing light beam passes through the compensation block, L3 is a length of a path along which the outgoing light beam passes from the another end face of the compensation block to the another optical component, and n is a refractive index of the compensation block.

3. The optical component according to claim 1, wherein the compensation block is an optical component in a shape of a wedge.

4. The optical component according to claim 1, wherein an anti-reflective coating is plated on the end face of the two-dimensional fiber array.

5. The optical component according to claim 1, wherein the end face of the two-dimensional fiber array is obliquely polished as a whole by eight degrees.

6. An optical device, comprising:
   a two-dimensional fiber array, wherein an end face of the two-dimensional fiber array is obliquely polished as a whole;
   a compensation block disposed between the two-dimensional fiber array and an optical component, wherein L1 is a length of a path along which any outgoing light beam of the obliquely polished end face of the two-dimensional fiber array passes from the obliquely polished end face to the end face of the compensation block, and wherein L1 is greater than zero; and
   the optical component, wherein L3 is a length of a path along which any outgoing light beam passes from a second end face of the compensation block to the optical component, and wherein L3 is greater than zero;
   wherein the optical device is positioned so that any two light beams that pass through the two-dimensional fiber array and are emitted from the obliquely polished end face of the two-dimensional fiber array are incident to a first end face of the compensation block in parallel, and are incident to an end face of the optical component in parallel after being refracted by the second end face of the compensation block; and
   wherein the optical device is further positioned so that a first length ($\lambda 1$) of a path along which a first incident light beam is emitted from the obliquely polished end face of the two-dimensional fiber array, passes through the compensation block, and reaches the end face of the optical component is equal to a second length ($\lambda 2$) of a path along which a second incident light beam is emitted from the obliquely polished end face of the two-dimensional fiber array, passes through the compensation block, and reaches the end face of the optical component.

7. The optical device according to claim 6, wherein a common length ($\lambda$) of a path along which any light beam is emitted from the obliquely polished end face of the two-dimensional fiber array, passes through the compensation block, and reaches the end face of the optical component is obtained through calculation according to a formula $\lambda = L1 + (L2/n) + L3$, wherein L2 is a length of a path along which the outgoing light beam passes through the compensation block, and n is a refractive index of the compensation block.

8. The optical device according to claim 6, wherein there is an angle ($\alpha$) between a central optical axis of the optical device after deflection and an original central optical axis of the optical device, and a size of the angle a is the same as a size of an angle between an outgoing light beam of the compensation block and a central optical axis of the two-dimensional fiber array.

9. The optical device according to claim 8, wherein the compensation block is an optical component in a shape of a wedge.

10. The optical device according to claim 8, wherein an anti-reflective coating is plated on the end face of the two-dimensional fiber array.

11. A method of operating an optical component that includes a two-dimensional fiber array with an end face that is obliquely polished as a whole and a compensation block disposed between the two-dimensional fiber array and another optical component, wherein an end face of the compensation block that faces the two-dimensional fiber array forms an acute angle with respect to a sidewall of the compensation block in a plan view of the compensation block, the method comprising:
   causing two light beams to pass through the two-dimensional fiber array and be emitted from the obliquely polished end face of the two-dimensional fiber array, the two beams being incident to the end face of the compensation block in parallel, and being incident to an end face of the another optical component in parallel after being refracted by another end face of the compensation block;
   wherein a first length ($\lambda 1$) of a path along which a first incident light beam is emitted from the obliquely polished end face of the two-dimensional fiber array, passes through the compensation block, and reaches the end face of the another optical component is equal to a second length (λ2) of a path along which a second incident light beam is emitted from the obliquely polished end face of the two-dimensional fiber array, passes through the compensation block, and reaches the end face of the another optical component; and wherein the end face of the another optical component on which the two light beams are incident after being refracted by another end face of the compensation block forms an acute angle that is greater than zero with respect to a virtual line, the virtual line being perpendicular to a central optical axis of the two-dimensional fiber array.

12. The method according to claim 11, wherein a common length (λ) of a path along which any light beam is emitted from the obliquely polished end face of the two-dimensional fiber array, passes through the compensation block, and reaches the end face of the another optical component is obtained through calculation according to a formula $\lambda=L1+(L2/n)+L3$, wherein L1 is a length of a path along which any outgoing light beam of the obliquely polished end face of the two-dimensional fiber array passes from the obliquely polished end face to the end face of the compensation block, L2 is a length of a path along which the outgoing light beam passes through the compensation block, L3 is a length of a path along which the outgoing light beam passes from the another end face of the compensation block to the another optical component, and n is a refractive index of the compensation block.

13. The method according to claim 11, wherein the compensation block is an optical component in a shape of a wedge.

14. The method according to claim 11, wherein an anti-reflective coating is plated on the end face of the two-dimensional fiber array.

15. The method according to claim 11, wherein the end face of the two-dimensional fiber array is obliquely polished as a whole by eight degrees.

* * * * *